United States Patent [19]

Tardy

[11] 4,161,347
[45] Jul. 17, 1979

[54] CONNECTOR FOR AN OPTICAL FIBRE LINK

[75] Inventor: André Tardy, St. Germain les Arpajon, France

[73] Assignee: Compagnie Generale d'Electricite, Paris, France

[21] Appl. No.: 843,920

[22] Filed: Oct. 20, 1977

[30] Foreign Application Priority Data

Nov. 9, 1976 [FR] France ............... 76 33753

[51] Int. Cl.² ............................................. G01B 5/14
[52] U.S. Cl. ............................................ 350/96.21
[58] Field of Search ............... 350/96.20, 96.21, 96.22; 339/205

[56] References Cited

U.S. PATENT DOCUMENTS

| 4,046,454 | 9/1977 | Pugh | 350/96.21 |
| 4,050,783 | 9/1977 | Tardy | 350/96.21 |
| 4,062,624 | 12/1977 | Hammer | 250/96.21 |
| 4,088,386 | 5/1978 | Hawk | 350/96.21 |

FOREIGN PATENT DOCUMENTS

2314687 10/1973 Fed. Rep. of Germany ........ 350/96.21

*Primary Examiner*—Rolf G. Hille
*Attorney, Agent, or Firm*—Sughrue, Rothwell, Mion, Zinn and Macpeak

[57] ABSTRACT

In an optical fibre connector, the optical fibre is accurately positioned by clamping it in the channel formed between three parallel rollers each of which bears tangentially on the other two. If the fibre is of exactly the expected diameter such clamping is firm and precise, but given the variation in fibre diameters that must be accommodated there is a danger of there being excessive fibre play. This connector overcomes the problem of fibre tolerances by inserting resilient means in the said channel. Such resilient means may for example be constituted by a set of three resiliently deformable elastomer rings, one mounted on each rod.

8 Claims, 10 Drawing Figures

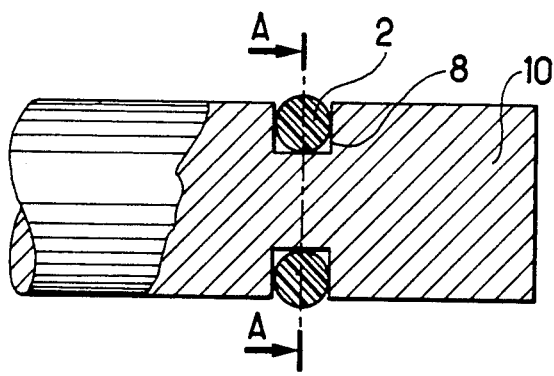
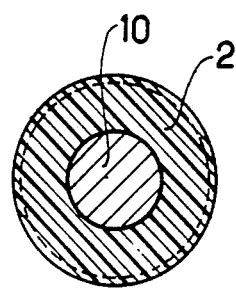
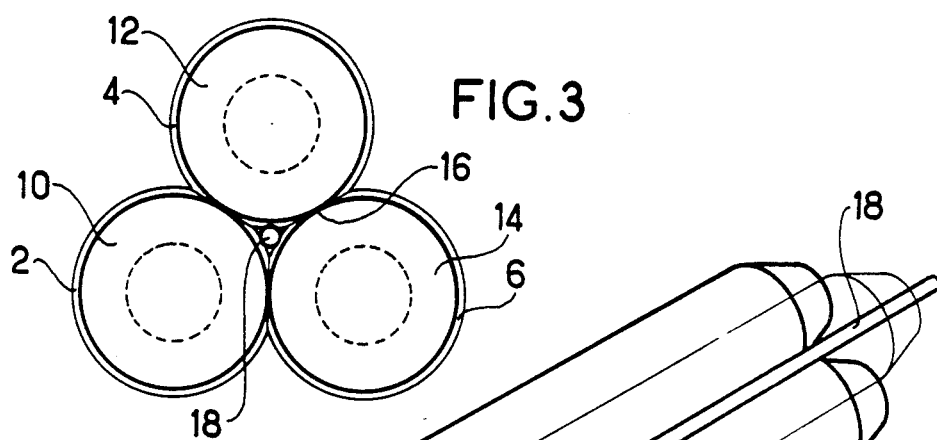
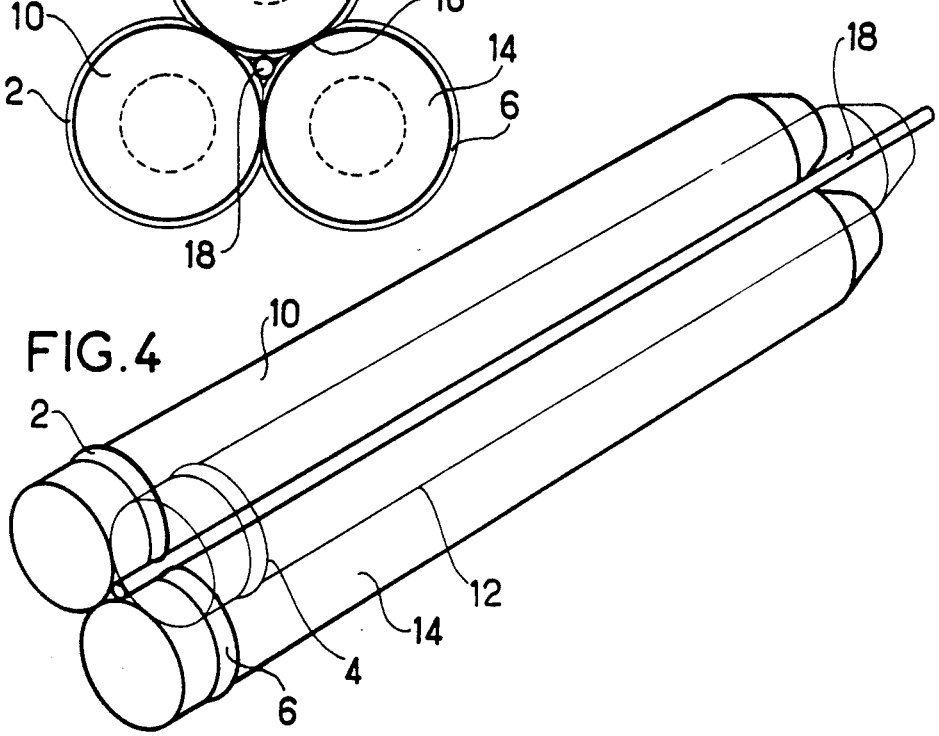

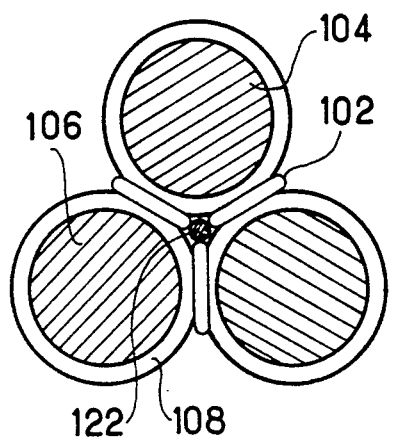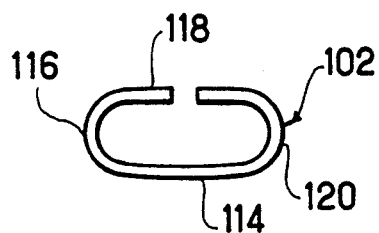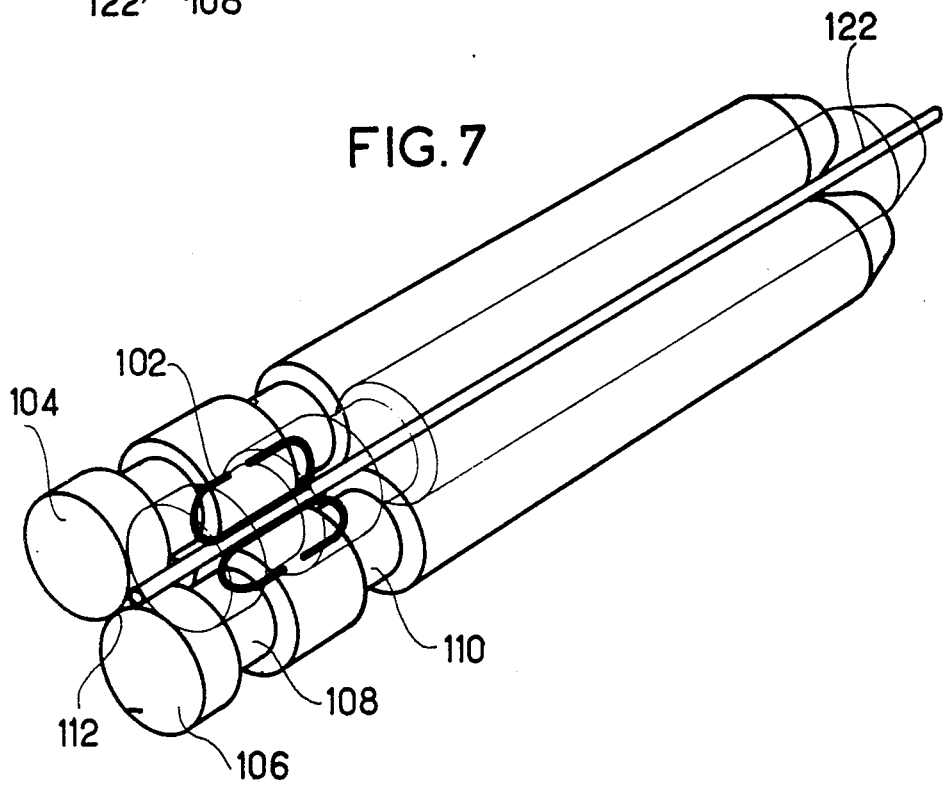

U.S. Patent   Jul. 17, 1979   Sheet 3 of 3   4,161,347
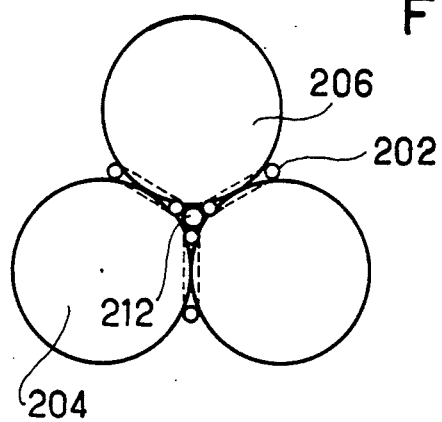
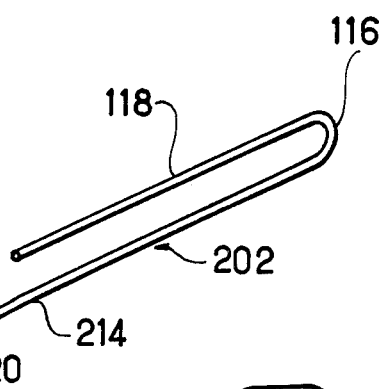
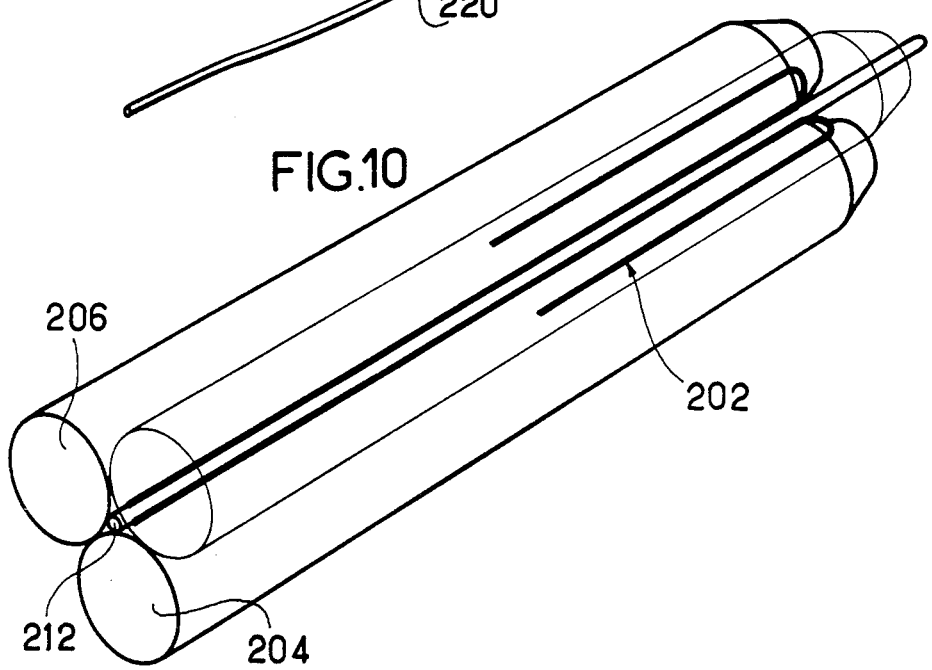

CONNECTOR FOR AN OPTICAL FIBRE LINK

FIELD OF THE INVENTION

This invention relates to a connector for use in an optical fibre link. In particular it relates to improvements in the connector described in U.S. Pat. No. 4,050,783.

That patent shows a connector for an optical fire link connecting optical fibre elements, and the connector:
at least one optical fibre forming one element and constituting a light guide.
guiding means are provided for guiding an end section of that fibre up to a position ensuring the connecting thereof to another optical element. The improvement therein comprises:
at least three holding rods which have the shape of cylinders of revolution;
and clamping means for keeping these holding rods parallel to one another and in contact by their lateral surfaces, forming together, a holding channel limited by the adjacent portions of the lateral surfaces of these rods.

Further the end section of the fibre is arranged in that holding channel, whereby the clamping means provides contact of all these rods with that fibre without substantially deforming the latter with said guide means acting on said holding rods to guide the fibre accurately and without any danger of damage up to the position ensuring the end connecting thereof to said other optical element.

It describes more particularly a device which can be used for forming a connector for an optical fibre link. In this connector the holding means for these three rods are constituted by means for clamping these rods against one another. The central channel formed by these rods fulfills the function of holding the fibre to be connected. This is why it will be called hereinafter the "holding channel", the three rods which form it being likewise called "holding rods."

The connectors for an optical fibre link constituted as previously set forth ensure very precise positioning of the fibres to be connected when there is a simultaneous contact of each holding rod with the other two holding rods and with the fibre. This requires that the diameter of this fibre should be exactly equal to that of the fibre for which the connector has been made. Unfortunately, commercially available optical fibres have imperfectly determined diameters. If the diameter of the fibre is too large, it is impossible to insert it in the holding channel formed by the three rods which are previously clamped against one another during the manufacture of the connector. This is why the connector has to be manufactured for the largest diameter of the fibres to be connected.

If the diameter of the fibre is too small, it can move radially in the holding channel and the optical connection is poor. If, for example, fibres are used whose diameters are in principle 125 microns but which may vary between 120 and 131 microns, holding rods having a diameter of 850 microns are chosen. The fibres with a diameter of 131 microns are then exactly positioned and are therefore optically well connected, but those having a diameter of 120 microns are incorrectly positioned and connected.

The present invention aims to provide a connector for an optical fibre link making it possible to constitute a connector capable of providing an excellent optical connection of fibres whose diameters are different in a predetermined range.

SUMMARY OF THE INVENTION

It provides a connector for an opticl fibre link comprising
at least one flexible optical fiber (18) constituting a light guide.
three holding rods (10, 12 14) are provided which are cylinders of revolution.
clamping means are provided for holding these holding rods parallel to one another and in contact in pairs by their lateral surfaces along three rectilinear contact lines, and forming between them a holding channel delimited by the facing parts of the lateral surfaces of these rods.

An end section of the fibre (18) is disposed in this holding channel.

Guide means are provided for pressing on the lateral outer surface of the assembly formed by these three holding rods for guiding the end section of the fibre with precision and without risk of damage up to a position ensuring its optical connection with the end of another optical element. The invention is characterized by the fact that a resilient system (2, 4, 6) is disposed in the holding channel, pressing against the lateral surface of at least one holding rod (10, 12, 14) so as to push the fibre (18) towards the other holding rods.

A non-limitative description of how the invention can be implemented will be given hereinbelow with reference to the accompanying schematic FIGS. 1 to 10.

Elements which correspond to each other in several of these figures are designated by the same reference symbols therein.

BRIEF DESCRIPTION OF THE DRAWINGS

FIG. 1 is an axial cross-sectional view of a holding rod provided with a resilient ring.

FIG. 2 is a transverse sectional view of the resilient ring of FIG. 1.

FIG. 3 is a transversal cross-section of a set of three holding rods fitted with resilient rings and clamped against one another and a holding channel in which an optical fibre is disposed.

FIG. 4 is a perspective view of the assembly of FIG. 3, one holding rod being shown as if it were transparent.

FIG. 5 is a transversal cross-sectional view of a set of three holding rods provided with three loops formed by a resilient wire.

FIG. 6 shows a plan view of one of the loops of FIG. 5.

FIG. 7 is a perspective view of the assembly in FIG. 5, one of the holding rods being shown as if it were transparent.

FIG. 8 is a transversal cross-section of a set of three holding rods provided with three U-shaped resilient metal wires.

FIG. 9 is a perspective view of one of the wires of FIG. 8.

FIG. 10 is a perspective view of the assembly of FIG. 8, with one of the holding rods being shown as if it were transparent.

DESCRIPTION OF PREFERRED EMBODIMENTS

In the various embodiments which will be described, the three holding rods have the same diameter. The resilient system is then symmetrical, i.e. it presses equally against the lateral surfaces of these three rods and projects equally from these three lateral surfaces in the holding channel so as to place the fibre in the axis of this channel.

According to a first embodiment shown in FIGS. 1 to 4, the resilient system is constituted by three identical resilient rings 2, 4 and 6, disposed respectively in three grooves such as 8 cut at a constant depth in the three holding rods and extending all around them, at the same distance from the end of the holding channel which is formed between the rods.

The rings project from the lateral surfaces of these rods. This projection is discontinued locally by compression and resilient deformation by the action of clamping means, not shown. This discontinuation of the projection appears on the three lines of contact such as 16 between two holding rods such as 10 and 12. These rings are also more or less compressed and resiliently deformed by an optical fibre 18 disposed in the holding channel formed between the rods 2, 4 and 6. This compression positions the fibre correctly in the axis of the channel. It increases with increase in fibre size. The rings 2, 4 and 6 project from the lateral surfaces of the holding rods with a slope which is less than 40° in the extension of these lateral surfaces. This slope can advantageously lie between 30° an 10°. The aim of this is that when an optical fibre is engaged in the holding channel and moves lengthwise, the circular end ridge of the fibre will slide on the lateral surfaces of the rings, compressing them without cutting them.

The rings 2, 4 and 6 such as represented have a circular crosssection and a hardness lying between 60 and 90 in the Shore scale type A. This shape has the advantage of simplicity. However, the precision of the positioning can be improved slightly by imparting to the rings a cross-section with a greater diameter in the longitudinal direction of the holding rods than in the radial direction. Indeed, the depth of the grooves such as 8 can then be reduced, this reducing the influence of possible differences of resilience between the three rings.

The ends of the three holding rods 10, 12, 14 are situated in a same plane perpendicular to their axes and the grooves such as 8 are cut in these rods at a same distance from this plane which distance is between once twice the diameter of these rods.

By way of an example, if optical fibres are connected whose diameters may vary between 120 and 131 microns, the holding rods 10, 12 and 14 can have a diameter of 850 microns with a tolerance of 0.4 microns in the radial direction along a length of 20 mm. They can be constituted of tempered steel, which allows precise machining. The rings 2, 4 and 6 have a large diameter of 870 microns and an inside diameter of 350 microns, the diameter of the cross-section of the ring therefore being 260 microns. The bottom of the grooves such as 8 can have a diameter of 355 microns, so that in the rings 2, 4 and 6 will be slightly stretched. The error on the position of the axis of the bottom of these grooves should preferably by less than 2 microns. They can be situated at one millimeter from the end of the fibre 18 to be connected. The elastomer constituting the rings can have a shore hardness of about 75.

According to a second embodiment of the invention shown in FIGS. 5, 6 and 7, the resilient system comprises three metal wires which bend resiliently and are in the form of loops such as 102 having four sides. Each loop is disposed between two holding rods such as 104 and 106. Each holding rod such as 104 has a first circular groove 108 and a second circular groove 110 cut therein in the vicinity of the end 112 of the holding channel. The first three and last three grooves are situated respectively at a same first distance and at a same second distance from this end. Each loop such as 102 has a first side 114 extending longitudinally in the channel partially pressing against two holding rods 104 and 106, a second side 116 radially going away from this channel, passing through the gap formed between these two holding rods by the first two grooves such as 108 cut in these two rods, a third side 118 extending longitudinally in the outside space pressing against these two holding rods and a fourth side 120 coming radially back into the holding channel, passing in the gap formed between these two holding rods by the two second grooves such as 110. The third side 118 can be interrupted as shown so that the loop will be open.

The cross-section plane in FIG. 5 passes across the second grooves such as 110.

The first side such as 114 of each loop such as 102 is convex so that the middle part of this side goes away from the rods such as 104 and 106 while going towards the axis of the holding channel, so as to bear resiliently on the fibre such as 122 disposed in this same channel if this fibre has too small a diameter for it to be able to touch the three holding rods simultaneously. There results therefrom a precise centring of this fibre. The diameter of the metal wires is chosen so as to be able to be recessed in the corners of the curvilinear triangle which constitutes the crosssection of the holding channel, without hindering the passage of a fibre having a maximum diameter, i.e. of a fibre which touches the three holding rods simultaneously.

Keeping the previously indicated values for the diameters of optical fibers and of holding rods, with respect to the first embodiment of the invention (with resilient rings), the metallic wire can have a diameter of 50 microns. It can be constituted by a spring metal such as beryllium bronze.

The above indications relating to the material of the wire and to its diameter remain valid in the third embodiment of the invention which will now be described with reference to FIG. 8 and 10.

In this embodiment, the resilient system comprises three resiliently bendable metal wires such as 202 in the shape of a U with three sides. Each wire is disposed between two holding rods such as 204 and 206. It has a first side 214 extenting longitudinally in the holding channel and partially bearing against the two holding rods 104 and 106, with a second side 116 extending away radially from this channel and a third side 118 extending longitudinally in the outside space bearing against these two holding rods 104 and 106. The first side has a part 220 which is convex towards the inside of the holding channel so as to centre fibres having a small diameter. To avoid having to cut a groove in the holding rods, the second side 116 is situated at the end of the holding channel by which the optical fibre 212 enters this channel.

What is claimed is:
1. Connector for an optical fibre link comprising:
   at least one flexible optical fibre constituting a light guide;
   three holding rods which are cylinders of revolution;
   clamping means for holding said holding rods parallel to one another and in contact in pairs by their lateral surfaces along three rectilinear contact lines and forming between them a holding channel de- limited by the facing parts of the lateral surfaces of said rods;

an end section of the fibre being disposed in said holding channel;

and guide means pressing on the lateral outside surface of the assembly formed by the three holding rods for guiding the end section of the fibre with precision and without risk of damage up to a portion ensuring its optical connection with another optical element, the improvement comprising: said three holding rods having the same diameter, said rods comprising grooves cut respectively at a constant depth in said holding rods, around said rods at a common distance from the end of the holding channel and resilient means comprising three identical resilient rings disposed respectively in said grooves, with said rings projecting from the lateral surfaces of the rods with projecting portions of said rings being reduced locally by compression and resilient deformation under action of the clamping means on contact lines between said holding rods.

2. Connector according to claim 1, wherein said rings project on the lateral surfaces of the holding rods with a slope which is less than 40° in the extension of these lateral surfaces so that when an optical fibre is engaged in the holding channel and moves longitudinally, the circular end ridge of said fibre will slide on the lateral surfaces of said rings, to compress them without cutting them.

3. Connector according to claim 2, wherein said rings have a circular cross-section and a hardness comprised between 60 and 90 in the Shore A score.

4. Connector according to claim 2, wherein said rings have a cross-section with a larger diameter in the longitudinal direction of the holding rods than in the radial direction.

5. Connector according to claim 2, wherein the ends of the three holding rods are situated in a same plane perpendicular to their axes, the grooves being cut in these rods at a distance from said plane lying between once and twice the diameter of said rods.

6. Connector for an optical fibre link comprising:

at least one flexible optical fibre constituting a light guide;

three holding rods which are cylinders of revolution;

clamping means for holding said holding rods parallel to one another and in contact in pairs by their lateral surfaces along three rectilinear contact lines and forming between them a holding channel delimited by the facing parts of the lateral surfaces of said rods;

an end section of the fibre being disposed in said holding channel;

and guide means pressing on the lateral outside surface of the assembly formed by the three holding rods for guiding the end section of the fibre with precision and without risk of damage up to a portion ensuring its optical connection with another optical element, the improvement comprising:

said holding rods having the same diameter, each of said holding rods being cut with first and second circular grooves axially spaced and in the vicinity of the end of the holding channel, said first three grooves and said second three grooves being situated respectively at a same first distance and at a same second distance from said end, resilient means comprising three resiliently bendable metal wires in the shape of four sided loops, each loop being disposed between two holding rods, with each of said loops having a first side extending longitudinally in the holding channel partially pressing against two holding rods, a second side extending radially away from said channel, passing in the gap formed between said two holding rods as defined by the first two grooves cut in said two rods, a third side extending longitudinally in the outside space bearing against said two holding rods and a fourth side extending radially back in the holding channel, passing in the gap formed between said two holding rods by the two second grooves cut in said two rods, said loops pressing against the lateral surface of at least one holding rod so as to push the fibre towards the other holding rods.

7. Connector for an optical fibre link comprising:

at least one flexible optical fibre constituting a light guide;

three holding rods which are cylinders of revolution;

clamping means for holding said holding rods parallel to one another and in contact in pairs by their lateral surfaces along three rectilinear contact lines and forming between them a holding channel delimited by the facing parts of the lateral surfaces of said rods;

an end section of the fibre being disposed in said holding channel;

and guide means pressing on the lateral outside surface of the assembly formed by the three holding rods for guiding the end section of the fibre with precision and without risk of damage up to a portion ensuring its optical connection with another optical element, the improvement comprising:

resilient means disposed in the holding channel and pressing against the lateral surface of at least one holding rod so as to push the fibre towards the other holding rods, said holding rods having the same diameter and wherein said resilient means also presses against the lateral surfaces of the three holding rods and projecting also on the three lateral surfaces on the said holding channel so as to place the fibre in the axis of said channel, said resilient means further comprising two resiliently bendable metallic wires in the shape of U with three sides, each wire being disposed between two holding rods and having a first side extending longitudinally in the holding channel, partially bearing against two holding rods, a second side extending radially away from said channel and a third side extending longitudinally in the outside space bearing against said two holding rods.

8. Connector according to claim 7, wherein said second side is situated at the end of the holding channel by which the optical fibre enters said channel.

* * * * *